United States Patent

[11] 3,618,068

| [72] | Inventor | Clarence R. Sloan<br>732 N. First Ave., Upland, Calif. 91786 |
|---|---|---|
| [21] | Appl. No. | 809,612 |
| [22] | Filed | Mar. 24, 1969 |
| [45] | Patented | Nov. 2, 1971 |

[54] COMBINATION FISHING POLE HOLDER AND SIGNALLING DEVICE
5 Claims, 5 Drawing Figs.

[52] U.S. Cl. .................................................. 340/283, 43/17
[51] Int. Cl. ........................................................ A01k 93/00
[50] Field of Search .......................................... 340/283; 43/17

[56] References Cited
UNITED STATES PATENTS

| 2,567,777 | 9/1951 | Massino | 43/17 |
| 3,041,769 | 7/1962 | Bray et al. | 43/17 |
| 3,058,251 | 10/1962 | Brooks | 43/17 |
| 3,064,244 | 11/1962 | McCreary et al. | 43/17 UX |
| 3,156,997 | 11/1964 | Smith | 43/17 |
| 3,359,672 | 12/1967 | Schwartz et al. | 43/17 |
| 3,440,753 | 4/1969 | Kelley | 43/17 |

Primary Examiner—John W. Caldwell
Assistant Examiner—Scott F. Partridge
Attorney—Mansel A. Gray ABSTRACT: A fishing pole holder and alarm comprising a stake adapted to be inserted in the ground, a transverse pole support adjustably mounted on the stake, a switch carried by the outer end of the support, actuable upon depression of the pole, a visual and audible alarm connected to the switch, and a second switch for alternately actuating the visual or audible alarm.

PATENTED NOV 2 1971
3,618,068
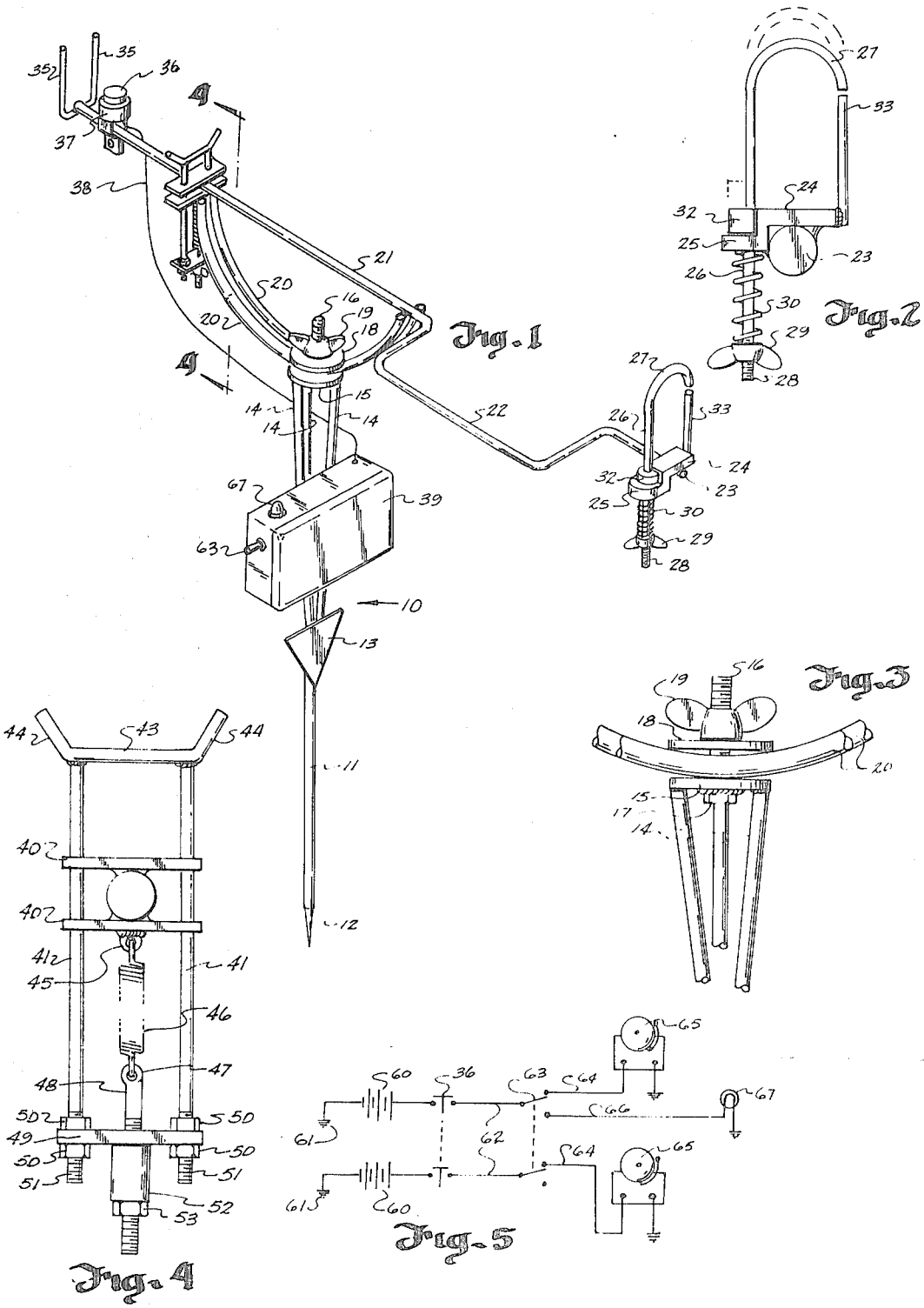
INVENTOR.
CLARENCE R. SLOAN
BY
*m a Gray*
AGENT

COMBINATION FISHING POLE HOLDER AND SIGNALLING DEVICE

This invention relates to a fishing pole holder, and has as its primary object the provision of such a holder which will retain a fishing pole or rod, and when a fish strikes, provide either a visual or audible alarm to attract the attention of the fisherman.

A further object of the invention is the provision of a device of this character which is substantially self-contained, and includes a support adapted to be driven into the ground and an alarm box carried by said support.

A further object of the invention is the provision of means for adjusting the angle of inclination of the pole support relative to the holder support.

A further object of the invention is the provision of radially releasable means for retaining the pole in position.

Still another object of the invention is the provision of means whereby either the audible or visual alarm may be actuated selectively.

Still other objects reside in the combination of elements, arrangements of parts and features of construction all as will be more fully pointed out hereinafter and disclosed in the accompanying drawing.

Briefly, the invention consists of a pointed upright for insertion into the ground, a rod or pole holder adjustably mounted on the upper end of the support, a hook for releasably retaining the butt of the rod, a yieldable bracket adjacent the other end of the rod holder, a switch adjacent the bracket, and a connection between the switch and audible and visual alarm signals contained in a receptacle mounted on the upright.

In the drawing:

FIG. 1 is a perspective view of one form of fishing pole holder constructed in accordance with the instant invention;

FIG. 2 is an enlarged end elevational view of a portion of the holder as viewed from the right;

FIG. 3 is a fragmentary side elevational view of a constructional detail;

FIG. 4 is an enlarged sectional view taken substantially along the line 3—3 of FIG. 1 as viewed in the direction indicated by the arrows; and FIG. 5 is a schematic wiring diagram.

Similar reference characters refer to similar parts throughout the several views of the drawing.

Having reference now to the drawing in detail, the pole or rod holder of the instant invention is generally indicated at 10 and includes an upright or holder support 11 having a pointed end 12 adapted for insertion into the ground, and a triangular spade 13 by means of which pressure may be exerted to force the pointed end 12 into the ground.

The upper end of upright 11 is trifurcated as at 14, and a cylindrical plate or washer 15 is supported on the upper end of the trifurcations. A stud or bolt 16 having a head 17 extends through an opening in plate 15 and carries a clamping washer 18 and a wingnut 19. A pair of arcuate support members 20 extend on opposite sides of bolt 16 and are secured at their other extremities to an elongated pole-supporting rod 21. Pole-supporting rod 21 has an offset portion 22 to accommodate a fishing reel, and at its far end is provided with an aligned portion 23 to which is secured a plate 24 having an offset end portion 25. The offset end portion is apertured to receive the stem 26 of a hooklike member 27, the extremity of stem 26 being threaded as at 28, and carrying a wingnut 29. A coil spring 30 is interposed between the wingnut and offset portion 25, and a stop member 32 is positioned on the stem above offset portion 25. The free end of hook 27 is normally aligned with an upright 33 carried by the offset end of plate 24. The arrangement is thus such that by pressure on wingnut 29 the hook 27 may be lifted to permit the handle of a fishing pole to be inserted between upright 33 and stem 26, and upon release, hook 27 will securely hold the handle in position. Wingnut 29 may be adjusted to vary the spring tension, biasing hook 27 into clamping relation.

The opposite end of rod support 21 carries a pole-engaging bracket 35 adjacent which is positioned an audible alarm-actuating switch button 36 in a holder 37. Suitable wiring 38 connects the switch button with alarm mechanism contained in a receptacle 39 mounted on trifurcations 14 and to be more fully described hereinafter.

Rod support 21 extends between and is affixed to a pair of plates 40 slidably mounted on a pair of parallel uprights 41. The upper portions of rods 41 are connected by a transverse member 43 having angled extensions 44 at the ends thereof for retention of the fishing pole. Bottom plate 40 carries an eye 45 on the underside thereof connected to one end of a coil spring 46, the opposite end of which is connected to an eye 47 carried by the extremity of a bolt 48. The latter extends through an opening in plate 49 which is adjustably secured by locknuts 50 on opposite sides thereof on the threaded lower extremities 51 of uprights 41. Bolt 48 extends through a bushing 52 secured to the underside of plate 49, and is adjustably positioned by means of a locknut 53. The arrangement is thus such that a fishing rod supported on plate 24 with its butt held in position by hook 27 extending across member 43 and between members 35 is depressed by a fish striking the hook. Member 43 will yield until the rod depresses switch button 36, actuating the alarm in a manner to be described hereinafter, and when pressure on the rod is released, spring 46 will bias supporting member 43, and hence the fishing rod, back into inoperative position.

Switch 36, as best shown in FIG. 5, closes a pair of circuits between a pair of batteries 60 grounded as at 61, and wires 62 which extend through a double-throw manual switch 63 positioned on the side of alarm box 39. When switch 63 is in one position, it engages wires 64 leading to audible alarm 65 so that when switch 36 is closed by a strike, the audible signal is actuated. When switch 63 is in another position of adjustment, it closes a circuit through a wire 66 to a visual alarm 67 which comprises a bulb located exteriorly of switch box 39. Switch 63 may also be moved to an intermediate or "off" position when no alarm is desired. Wire 38 is omitted in the diagrammatic showing, but obviously merely accommodates the remote positioning of switch 36.

Adjustment of the angle of the fishing pole as well as its direction of extension may be varied by loosening wingnut 19 and adjusting rod 21 directionally and angularly relative to bolt 16, and then reclamping the device through wingnut 19 and clamping washer 18.

From the foregoing it will now be seen that there is herein provided an improved visual and audible alarm for fishing poles which accomplishes all of the objects of this invention, and others, including many advantages of great practical utility.

What is claimed is:

1. A fishing pole holder comprising, in combination, an upright holder support adapted to be inserted in the ground, clamping means carried by the top of said upright holder support, a pair of arcuate members, an elongated transverse rod support having an offset portion adapted to receive the reel of a fishing pole, said support being carried by the ends of said arcuate members, said arcuate members extending on opposite sides of said clamping means for varying the angle of said rod support, spring-biased hook means at one end of said rod support for retaining the butt of a fishing pole, pole-engaging means at the opposite end of said rod support to limit lateral movement of a fishing pole, a vertically yieldable spring-biased bracket between the ends of said rod support having a transverse pole-supporting bar, a depressable switch means adjacent and normally positioned below the plane of said pole-supporting bar, an alarm box, an electric alarm in said box and an operable connection between said switch means and said alarm, whereby when a supported fishing pole is depressed by a striking fish said pole-supporting bar and said bracket will yield until the pole depresses said switch means to actuate said alarm.

2. The structure of claim 1 wherein said alarm box contains a visual alarm and an audible alarm, and switch means for selectively energizing either said visual or said audible alarm.

3. The structure of claim 1 wherein said hook means includes an apertured plate secured to said elongated rod, a vertical rod extending through the aperture, a hook at one end of said vertical rod, a stop at the other end of said vertical rod, spring means between said stop and said plate, and a second vertical rod on said plate engageable with the free end of said hook.

4. The structure of claim 1 wherein said yieldable bracket includes a pair of apertured plates fixed on opposite sides of said elongated rod, upright bars extending through the apertures, a transverse pole-supporting bar extending between the said upright bars on one side of said elongated rod, a plate extending between said upright bars on the opposite side of said elongated rod, and spring means extending between said last-mentioned plate and the adjacent one of said pair of apertured plates.

5. The structure of claim 1 wherein batteries are contained in said alarm box for energizing said alarm.

* * * * *